Patented July 23, 1940

2,208,808

UNITED STATES PATENT OFFICE 2,208,808

METHOD FOR THE SEPARATION OF ACYLATABLE SUBSTANCES FROM MIXTURES CONTAINING SAME

Franz Gottwalt Fischer, Freiburg, Germany, assignor to Schering Aktiengesellschaft, Berlin, Germany, a corporation of Germany No Drawing. Application September 22, 1936,
Serial No. 101,939

11 Claims. (Cl. 260—643)

This invention relates to a method for the separation from a mixture, of substances therein which are capable of being acylated, more particularly to such organic compounds as have a hydroxyl group in their molecule and which are, therefore, capable of acylation.

This application is a continuation of my copending application Ser. No. 14,629, filed April 4, 1935.

Great difficulties have been encountered in attempting to separate from such a mixture, of such constituents as are capable of being acylated from those not capable of being acylated, especially when the constituents capable of acylation are present only in a comparatively small amount. Hitherto, in order to separate such substances one made use of the reaction of said substances with reagents which contained, besides a group serving for acylation, another group capable of forming salts or of being transformed into the salt-forming amino group. On separating the condensation products obtained by this reaction from those portions which did not participate therein and on subsequently splitting the condensation products, the substances capable of acylation originally contained in said mixture have been obtained. One has suggested for this purpose as condensing agents, for instance, phthalic acid anhydride, salicylic acid chloride, chloro-sulphonic acid and the like.

The present invention is based upon the discovery that acylatable substances present in a mixture of substances may be caused to form esters with sulphonic carboxylic acids, particularly in a non-aqueous medium, which esters may be separated in the form of their salts from the non-reacted components of said mixture. I have further determined that such salts may be readily saponified to give the acylatable substances. The method, therefore, comprises three essential parts, the reaction to form an ester of a sulphonic carboxylic acid, the separation thereof in the form of the salt of said ester, and the saponification of the separated ester product to regenerate the original substance.

In accordance with the present invention I have found that it is possible to separate very readily and with a very good yield the constituents capable of acylation from those constituents which are incapable of acylation, by reacting their mixture with a derivative of or with the sulfonic carboxylic acid of the general formula

wherein X is OH or halogen whereupon the ester of the sulfonic carboxylic acid

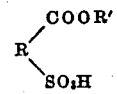

is formed in accordance with the following equation:

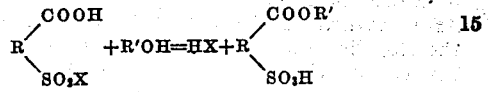

wherein R and R' are unsubstituted or substituted radicals taken from the class consisting of aliphatic, alicyclic, aromatic, and heterocyclic radicals. The ester is separated in the form of a salt from the non-reacted compounds by having present a salt forming compound. The constituent of said mixture capable of acylation is then obtained by saponification of said ester salt of said sulphonic carboxylic acid.

The sulphonic carboxylic acid is preferably caused to react in the form of the halide, such as the chloride. Advantageously the reaction is carried out in the presence of a tertiary amine, such as pyridine, quinoline, dimethyl aniline and the like. Thereby the ester of the sulfonic carboxylic acid which is formed, is precipitated by means of an organic solvent, such as benzine, benzene, ether and the like, in the form of the salt of said tertiary amine whereby the unreacted portions remain in solution.

The process of this invention as described in principle in the foregoing has the following essential advantages over the known processes:

(1.) It has the advantages of the esterification with acid halides, for example, chlorides, in the presence of a tertiary amine which results in a rapid, practical, quantitative reaction without any danger of splitting off water. Therefore this method is considerably superior to the phthalic acid anhydride method.

(2.) On reaction with the carboxylic acid sulfonic chloride the readily saponifiable carboxylic acid esters are formed. In contrast hereto when using chlorosulfonic acids as condensing agents, the sulfonic acid esters are obtained which above all, especially in the case of the esters of higher alcohols usually are very resistant towards the saponification liquids. In the present invention, on the other hand, the presence of the sulfonic group causes the formation of salts of the tertiary amines used, which the insoluble in organic liquids.

(3.) Due to the absence of aqueous solutions in the course of the condensation reaction, the formation of soap emulsions is prevented entirely, as is also the reciprocal influence of soap and the neutral portion upon the solubility.

The present process may be used for many purposes and is especially adapted for separating the higher alcohols from the neutral hydrocarbons. But the procedure is equally applicable to the isolation of the lower alcohols of aromatic, aliphatic and other character, as well as other organic hydroxy compounds having alicyclic, heterocyclic and other configurations. Also such hydroxy compounds may contain substituent radicals and may be combined with other compounds such as amines. Among the many such compounds available, may be mentioned benzyl alcohol, phenols, cyclohexanols, high molecular weight sterin alcohols with ring structure, combinations with piperidine and the like, amyl and similar alcohols.

Example 1

Separation of myristic alcohol from paraffine oil.

A mixture of 1.07 grams of myristic alcohol and 4 cc. paraffine oil are dissolved in 20 cc. of pyridine by heating on a boiling water bath; the solution is mixed with 2 grams of meta-benzoic acid sulfonic chloride (an excess of 25% is used). After heating for 10 minutes on the water bath the slightly yellow solution is cooled and poured into ether. The precipitate consisting of pyridine hydrochloride and the pyridonium salts of the esterified alcohol and the excess sulfonic acid, is removed by centrifuging, twice washed with ether on the centrifuge, freed from the ether and dissolved in a few cc. of water. After the addition of 10 cc. of concentrated potassium hydroxide solution the mixture is heated for 30 minutes on the water bath. On cooling quietly, 1 gram of myristic alcohol separates in the form of an almost pure white crust having a melting point about 36° C.

In the recovery of the neutral portion, i. e. the solution remaining after separation of the precipitated ester salts, ether and pyridine are advantageously removed by distillation, because, the extraction of ethereal solution with dilute mineral acids frequently results in the formation of stable emulsions.

Example 2

A mixture of 2 grams of cetyl alcohol and 2 grams of ethyl cetyl ether, which can not be separated by distillation, are dissolved on the boiling water bath in pyridine and reacted with 4 grams of para-toluol-carboxylic-sulfonic acid having the following structural formula:

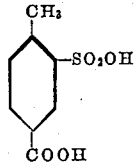

After heating for about 10 minutes the solution is cooled and the mixture of the amine salts is precipitated by means of petroleum ether, the precipitate is separated and washed with petroleum ether; the ester-salt obtained thereby yields on saponification with alcoholic potassium hydroxide solution 1.8 gram of pure cetyl alcohol. From the petroleum ether solution, on evaporation to dryness, the ethyl cetyl ether is recovered.

Example 3

5 grams of a mixture of about 60% of hydrofarnesol and 40% of farnesan as it is obtained by catalytic hydrogenation of farnesol are dissolved in pyridine. To this solution 5 grams of p-chloro benzoic acid sulfonic acid chloride having the following structural formula:

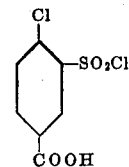

are added. After heating for one hour to 40° C. the pyridonium salts are precipitated by the addition of petroleum ether, separated by centrifuging, washed with petroleum ether and saponified by heating for two hours in 20% potassium hydroxide solution. On distilling the saponification liquid 2.5 grams of pure hydrofarnesol are obtained. The hydrocarbon can be isolated from the petroleum ether.

However, the process may also be carried out in such a manner that the mixture of substances to be separated and the carboxylic acid sulfonic chloride are dissolved separately in pyridine whereupon the two solutions are combined. The esterification may also be effected at another temperature as the given one and even when working at room temperature good results are obtained.

In the place of meta-benzoic acid sulfonic chloride also another carboxylic acid sulfonic halide may be used. For instance, phenyl acetic acid-m-sulfonic acid chloride or acetic acid sulfonic acid chloride or the like may be used as reaction components. As especially advantageous, however, there have proved the aromatic m-carboxylic acid sulfonic acid chlorides by the reaction of which with the acylatable substance there are formed carboxylic acid esters with free sulfonic acid group which can be saponified very readily.

The saponification of the esters formed can also be carried out by means of other saponification agents. On saponifying the esters of sterols and of other secondary alcohols, sodium ethylate has proved to be especially effective. As starting materials there may be used any kinds of mixtures containing at the same time neutral constituents as well as compounds which are capable of acylation. The separation of the latter compounds is accomplished by this method in general with a yield of 85 to 95%. Thereby also the neutral portions are recovered in an entirely unchanged form.

Not only are the above described types of said acids, namely aromatic, aromatic-aliphatic and aliphatic carboxylic acid sulphonic acid compounds suitable for the present invention, but other types are also available. For example, alicyclic acids such as d-camphoric-sulphonic acid of the melting point of 188° C., and heterocyclic acids such as quinolin-4-carboxylic acid-6 or 8-sulphonic acid, may also be used in the process.

Although I have described my invention setting forth several specific embodiments thereof and also stated several variations which may be employed, it is to be understood that such description is intended to illustrate the nature of the invention and not to limit the same. The invention is to be broadly construed and the same is defined in the claims appended hereto.

What I claim as my invention is:

1. A method of separating higher alcohols taken from the class consisting of aliphatic and alicyclic alcohols capable of being acylated to esters from mixtures containing the same which comprises reacting said substances in such mixtures with the sulphonic acid chloride of a carboxylic acid to form an ester of said acid, and separating said ester from the reaction mixture.

2. A method of separating higher alcohols taken from the class consisting of aliphatic and alicyclic alcohols capable of being acylated to esters from mixtures containing the same which comprises dissolving said mixture in a tertiary amine, reacting said substances in such mixtures with the sulphonic acid chloride of a carboxylic acid to form an ester salt of said acid, and separating said ester from the reaction mixture.

3. A method of separating higher alcohols taken from the class consisting of aliphatic and alicyclic alcohols capable of being acylated to esters from mixtures containing the same which comprises dissolving said mixture in a tertiary amine, reacting said substances in such mixtures with the sulphonic acid chloride of a carboxylic acid to form an ester salt of said acid, and separating said ester from the reaction mixture by pouring the same into a non-solvent for said ester thereby precipitating said ester and the hydrochloride of said tertiary amine.

4. A method of separating higher alcohols taken from the class consisting of aliphatic and alicyclic alcohols capable of being acylated to esters from mixtures containing the same which comprises dissolving said mixture in a tertiary amine, reacting said substances in such mixtures with the sulphonic acid chloride of a carboxylic acid to form an ester salt of said acid, and separating said ester from the reaction mixture by pouring the same into a non-solvent for said ester thereby precipitating said ester and the hydrochloride of said tertiary amine, dissolving the precipitate thus produced, adding an alkaline saponifying agent thereto to liberate said substance and said amine, and causing said substance to separate from the solution.

5. A method of separating higher alcohols taken from the class consisting of aliphatic and alicyclic alcohols capable of being acylated to esters from mixtures containing the same characterized by the fact that the mixture is reacted with a sulphonic carboxylic acid of the general formula

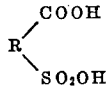

wherein R is a radical taken from the class consisting of aliphatic, alicyclic, aromatic and heterocyclic radicals, said sulphonic carboxylic acid being used in the form of the free carboxylic acids and the carboxylic acid sulphonic halides in the presence of a tertiary amine, and that the sulphonic carboxylic acid esters formed are precipitated as salts of said amine by means of organic solvents wherein the non-acylated portions remain dissolved, said ester sulphonic acid thereupon being saponified.

6. A method of separating organic compounds taken from the class consisting of higher aliphatic and alicyclic alcohols capable of being acylated to esters from mixtures containing the same which comprises reacting said substances in such mixtures with a compound of the general formula

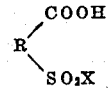

wherein R is an organic radical taken from the class consisting of aliphatic, alicyclic, aromatic, heterocyclic radicals and X is taken from the class consisting of OH and halogen to form a carboxylic acid ester of said sulphonic acid in the presence of a compound of alkaline reaction.

7. A method of separating organic compounds taken from the class consisting of higher aliphatic and alicyclic alcohols capable of being acylated to esters from mixtures containing the same which comprises reacting said substances in such mixtures with a compound of the general formula

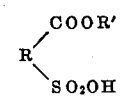

wherein R is an organic radical taken from the class consisting of aliphatic, alicyclic, aromatic, heterocyclic radicals and X is taken from the class consisting of OH and halogen in the presence of a compound of alkaline reaction, to form a salt of a carboxylic acid ester of said sulphonic acid having the general formula

wherein R and R' are organic radicals taken from the class consisting of aliphatic, alicyclic, aromatic, heterocyclic radicals.

8. A method of separating organic compounds taken from the class consisting of higher aliphatic and alicyclic alcohols capable of being acylated to esters from mixtures containing the same which comprises reacting said substances in such mixtures with a compound of the general formula

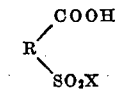

wherein R is an organic radical taken from the class consisting of aliphatic, alicyclic, aromatic, heterocyclic radicals and X is taken from the class consisting of OH and halogen to form a carboxylic acid ester of said sulphonic acid in the presence of a salt forming compound and separating the obtained salt of said ester from the reaction mixture by pouring the same into a non-solvent for said ester-salt.

9. A method of separating organic compounds taken from the class consisting of higher aliphatic and alicyclic alcohols capable of being acylated to esters from mixtures containing the same which comprises dissolving said mixture in a tertiary amine, reacting said substances in such mixtures with a compound of the general formula

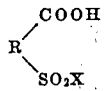

wherein R is an organic radical taken from the class consisting of aliphatic, alicyclic, aromatic, heterocyclic radicals and X is taken from the class consisting of OH and halogen to form a carboxylic acid ester of said sulphonic acid and separating said ester from the reaction mixture.

10. A method of separating organic compounds taken from the class consisting of higher aliphatic and alicyclic alcohols capable of being acylated to esters from mixtures containing the same which comprises heating said substances in such mixture with a compound of the general formula

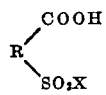

wherein R is an organic radical taken from the class consisting of aliphatic, alicyclic, aromatic, heterocyclic radicals and X is taken from the class consisting of OH and halogen to form a carboxylic acid ester of said sulphonic acid in the presence of a salt forming compound and separating the obtained salt of said ester from the reaction mixture by pouring the same into a non-solvent for said ester-salt, dissolving the precipitate thus produced and adding an alkaline saponifying agent thereto.

11. A method of separating organic compounds taken from the class consisting of higher aliphatic and alicyclic alcohols capable of being acylated to esters from mixtures containing the same which comprises heating said substances in such mixture with a compound of the general formula

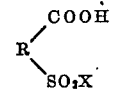

wherein R is an organic radical taken from the class consisting of aliphatic, alicyclic, aromatic, heterocyclic radicals and X is taken from the class consisting of OH and halogen to form a carboxylic acid ester of said sulphonic acid in the presence of a salt forming compound and separating the obtained salt of said ester from the reaction mixture by pouring the same into a non-solvent for said ester-salt, dissolving the precipitate thus produced and adding an alkaline saponifying agent thereto, whereby on gentle heating said substance separates out.

FRANZ GOTTWALT FISCHER.